Sept. 25, 1956  W. HOWLEY ET AL  2,764,128
EGG OPERATED FOWL TRAP NEST
Filed Aug. 24, 1954
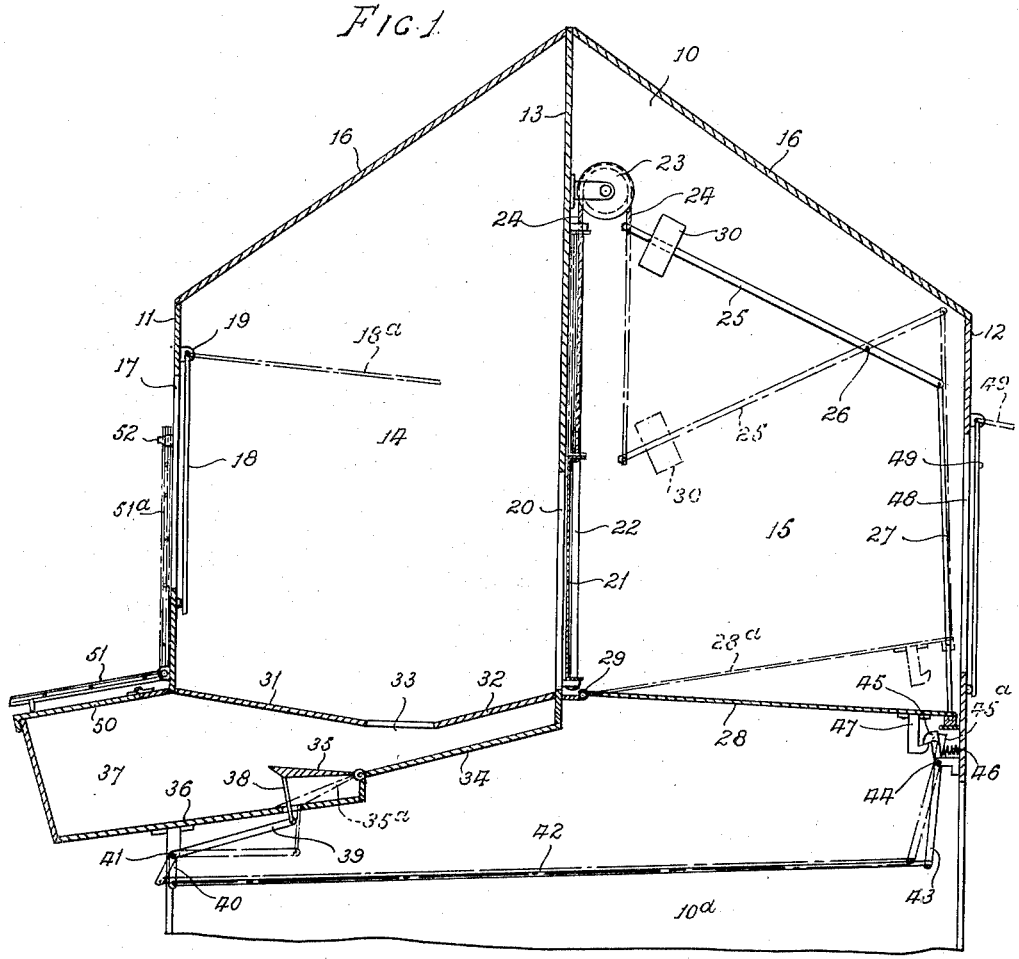
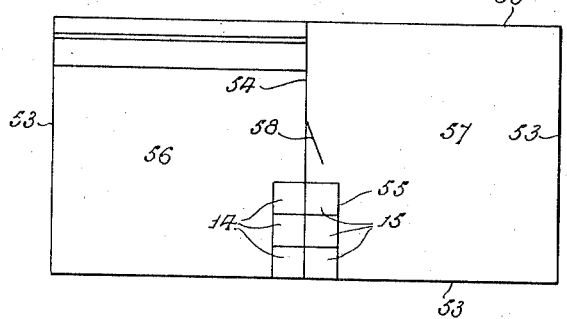
INVENTORS:- WILLIAM HOWLEY
AND - KENNETH EGLIN
BY:- Victor D. Borst

United States Patent Office 2,764,128
Patented Sept. 25, 1956

2,764,128

EGG OPERATED FOWL TRAP NEST

William Howley and Kenneth Eglin, Whitworth, near Rochdale, England; said Eglin assignor to said Howley Application August 24, 1954, Serial No. 451,835

1 Claim. (Cl. 119—50)

This invention relates to nest boxes for domestic birds such as hens and is particularly, but not exclusively, concerned with the nest boxes or cages used in large-scale egg-producing undertakings, such as poultry farms.

For some considerable time prior to the present invention, there has been considerable discussion as to whether the "battery" system, wherein the birds are permanently cooped within a small cage, is better than the system where the hens are free to exercise or search for food to augment that supplied by the poultry farmer and only entering a hen cote or coop for the purpose of laying or roosting.

Undoubtedly, it has been proved that the "battery" system does result in maintaining a high yield of eggs per bird over a limited period, but whether it is accompanied by discomfort and suffering due to limiting the birds to a confined space is a subject of great speculation.

The object of the present invention is to provide a trap nest which the bird can enter voluntarily, is imprisoned within the nest until after laying, and thereafter allowed to leave the nest and remain free until again desirous of laying. By this arrangement, the advantages of both systems outlined above are obtained.

According to the present invention, a trap nest or nest-box for domestic birds such as hens, comprises a box or cage-like nest having an entrance through which the bird can pass into a laying compartment of the nest, there being closure means for preventing a bird leaving the nest by the entrance, an inclined floor down which a newly laid egg can roll to a receiver, said inclined floor having means operable by the rolling egg for opening an exit aperture, and means operable by the weight of the bird as it leaves the nest after passing through the exit aperture for closing said exit aperture and re-setting the said opening means.

Conveniently, a number of said nest boxes are placed in line down the centre of a hen cote so as to provide a partition or be disposed at a partition or the like dividing the same longitudinally into two compartments, the birds passing from the first compartment to the second via the trap nests. By this means, a check can be kept on which birds are laying and which are not.

It has been found advantageous to raise the line of trap nests to a height of, say, 2 ft. above the ground, and the cote can therefore be supported upon or above a wire mesh partition dividing the hen-cote into two compartments, suitable doors being provided in the partition to enable the hens to be transferred between the compartments.

The invention will be described further, by way of example, with reference to the accompanying drawings in which:

Fig. 1 is a longitudinal section through a trap nest according to the present invention; and Fig. 2 is a diagrammatic plan view on a reduced scale of a hen cote or coop employing three of the trap nests.

Referring to Fig. 1 of the drawings, the trap nest comprises side walls 10 (of which one only is visible in the drawing), a front wall 11, a rear wall 12, and an intermediate transverse wall 13 which divides the nest into a laying compartment 14 and an exit compartment 15. These walls, together with the nest roof 16 may conveniently be of wood or sheet metal.

An entrance aperture 17 is provided in the front wall 11, and within the laying compartment 14 a light door or "bob-wire" 18 is pivoted at 19 over the entrance aperture 17, so that a bird can enter the laying compartment 14 but cannot leave it by the aperture 17.

In the intermediate transverse wall 13 is an exit aperture 20, this being normally closed by a sliding door or shutter 21 located upon guide rails 22 (of which one only is visible in the drawing) and capable of up and down movement on these rails 22. Secured to each side wall 10 in the exit compartment 15 is a pulley wheel 23, and a cord 24 passing over this pulley wheel 23 is secured at one end to the shutter 21 and at the other end to a lever 25 which is capable of angular movement about a pin 26 on the wall 10. At its end remote from the cord 24 a connecting rod 27 extends from the lever 25 to the edge of a platform 28 forming the floor of the exit compartment 15. The platform 28 is hinged at 29, and on the lever 25 there is provided a weight 30 sufficient to raise the platform 28 about its hinge 29 as shown in dotted lines at 28a.

The floor of the laying compartment 14 is formed in two parts 31, 32, secured respectively to the front wall 11 and the intermediate wall 13, and both inclined downwards to an egg aperture 33 approximately midway between the two walls 11, 13. Located below the part 32 is a secondary floor 34 which is contiguous with the intermediate wall 13 and which slopes forwardly towards the front of the trap. This secondary floor 34 terminates in a release tray or flap 35 which is pivoted thereto and is capable of downward movement to a position shown in dotted lines at 35a to form an inclined ramp between the secondary floor 34 and the base 36 of an egg reception box 37. Near the lower end of the flap 35 a tie rod 38 extends downwards therefrom through the base 36 of the egg reception box and is secured to the longer arm 39 of a bell-crank lever pivoted at 41 to the base of the egg reception box, the shorter arm 40 of which is connected by an actuating rod 42 to a detent lever 43 which is pivoted at 44 on the rear wall 12. The upper end of the detent lever 43 is formed as a hook 45 which is loaded by a spring 46 away from the rear wall 12 into engagement with a depending hook 47 secured to the underside of the platform 28.

In the rear wall 12 there is an opening 48 through which birds may pass from the exit compartment 15, and to prevent birds entering the exit compartment 15 other than from the laying compartment 14, there is provided a light door or "bob-wire" 49 similar to the bob-wire 18. To permit access to the egg reception box 37, a hinged lid 50 is provided thereon, and a wire platform 51 pivotally secured above the lid 50 serves to clean a bird's feet prior to its entering the laying compartment. This platform 50 can be swung up to the position illustrated at 51a and secured in this position by a spring clip 52, so as to prevent birds entering the laying compartment 14, if desired. The side walls 10 can be extended downwardly as indicated at 10a to constitute legs for supporting the nesting box, or the boxes can be built in tiers so that the walls 10a constitute the side walls of a next lower nesting box.

The nesting box operates as follows: A bird enters the laying compartment 14, pushing the bob-wire 18 to the position 18a in entering. This bob-wire 18 falls back across the entrance aperture 17 after the bird has entered so that it becomes imprisoned in the laying compartment 14. The bird remains so imprisoned until such time as it lays an egg, which latter rolls through the egg aperture 33, down the secondary floor 34 and depresses the release flap 35 as it enters the egg receiving box 37. The depression of the flap 35 is transmitted through the levers and rods 38, 39, 40, 42 and 43 to move the hook 45 to the position indicated at 45a, so releasing its engagement with the hook 47.

As a consequence, the weight 30 acting through the lever 25 and connecting rod 27 raises the platform 28 to the position 28a and at the same time raises the shutter 21. The bird can therefore pass into the exit compartment 15 and as it does so, it depresses the platform 28 to its original position whereupon the hooks 45, 47, re-engage and the shutter 21 is permitted to slide down its guide rods 22 to close the exit aperture 20. The mechanism is therefore reset and when another bird enters the laying compartment 14 and lays an egg the cycle is repeated.

In Fig. 2 is illustrated a convenient manner in which the trap nests can be utilised in a hen coop or cote. The boundary of the coop is defined by wire fences 53, and this is divided transversely by a wire partitioning fence 54 and a battery of three trap nests 55 into a "non-layers" section 56 and a "layers" section 57. A connecting door 58 is provided in the fence 54.

The trap nests 55 are arranged so that their laying compartments 14 can be entered from the "non-layers" section 56 and the "layers" section 57 can be entered from their exit compartments 15. At the beginning of a day, all the birds are penned in the "non-layers" section 56, and after they lay their eggs they pass into the "layers" section 57. At the end of the day, the number of non-layers can immediately be ascertained, and by suitable vigilance the persistent non-layers can be identified.

Whilst in the foregoing one preferred form of trap nest has been described, it is to be understood that this should not be taken as limiting the invention as defined in the appended claim. Batteries of the trap-nests can be made in single units, these being in any convenient arrangement. For example, three traps may be made in a single unit, the outer side walls of the end units being continued downwards to constitute legs for the trap nest. Another convenient form of unit comprises two tiers of two traps arranged side by side.

We claim:

A trap nest comprising a box-like structure, a transverse wall dividing said structure into a laying compartment and an exit compartment, an entrance aperture to said laying compartment in the front wall of said structure, said laying compartment having means for preventing a bird leaving by said entrance aperture, an inclined floor fixedly supported by said laying compartment down which an egg laid by a bird will roll, an exit aperture in said transverse wall, a shutter disposed over said aperture and slidable upwardly to open said aperture, a hinged platform forming a floor for said exit compartment, levers and the like connecting said shutter with said platform so that downward movement of said platform moves said shutter downwards to close said exit aperture, a counterweight on said levers adapted to raise said platform and said shutter and detent means normally holding said platform in a downward position so that said exit aperture is closed by said shutter, the said detent means being releasable by said egg rolling down said inclined floor to permit said counterweight to raise said platform and said shutter.

References Cited in the file of this patent
UNITED STATES PATENTS

| | | |
|---|---|---|
| 1,224,318 | Paulson | May 1, 1917 |
| 1,253,855 | Markiel | Jan. 15, 1918 |
| 1,589,830 | Avila | June 22, 1926 |
| 1,708,824 | Baker | Apr. 9, 1929 |